March 26, 1957 W. H. KOCH 2,786,289
RELEASABLE GRAVITY RETURN GATE
Filed April 7, 1954 2 Sheets-Sheet 1
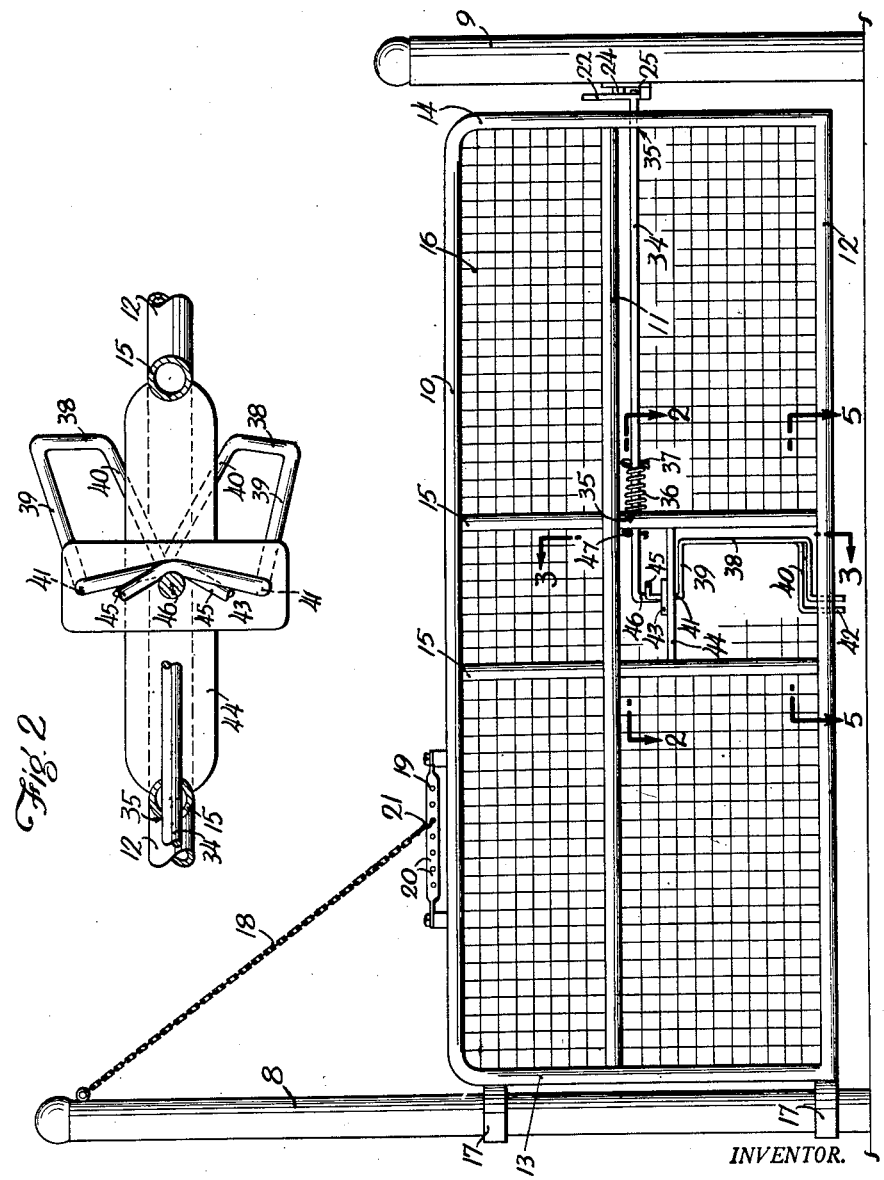
INVENTOR.
William H. Koch
BY
ATTORNEY March 26, 1957     W. H. KOCH     2,786,289
RELEASABLE GRAVITY RETURN GATE
Filed April 7, 1954     2 Sheets-Sheet 2
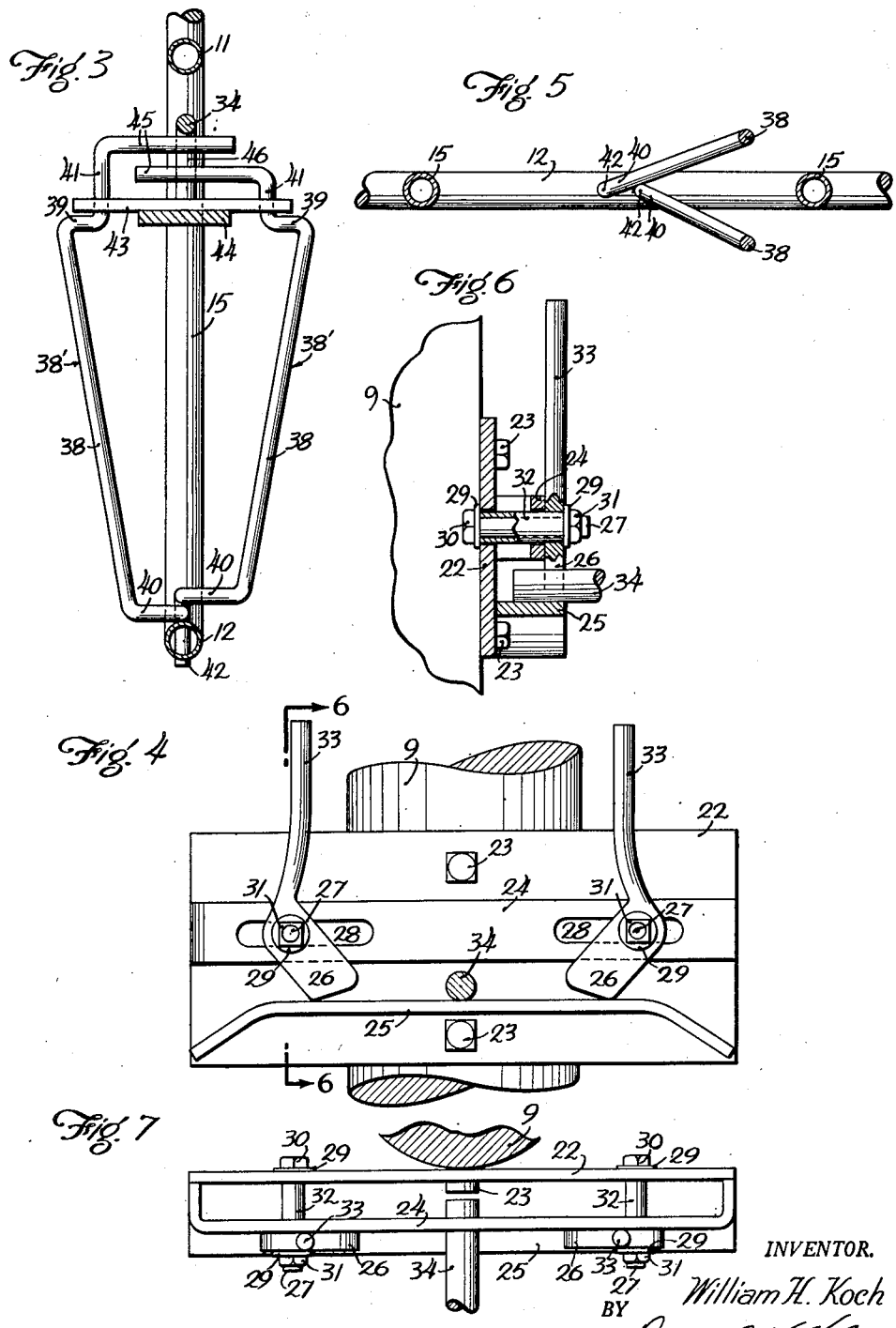
INVENTOR.
William H. Koch
BY
David K. Kilgore
ATTORNEY

United States Patent Office 2,786,289
Patented Mar. 26, 1957

2,786,289

RELEASABLE GRAVITY RETURN GATE

William H. Koch, Minneapolis, Minn.

Application April 7, 1954, Serial No. 421,475

7 Claims. (Cl. 39—31)

My present invention relates to improvements in swinging gates of the gravity return type.

The principal object of this invention is to provide novel latch mechanism for a swinging gate of the gravity return type and novel bump actuated mechanism for unlatching the same.

This and other objects will be apparent from the following description, reference being had to the drawings.

To the above end, the invention consists of the novel devices and combination of devices hereinafter described and defined in the claims.

In the accompanying drawings, which illustrate one embodiment of the invention, like characters indicate like parts throughout the several views.

Referring to the drawings:

Fig. 1 is a side elevational view of the gate closed, between two gate posts, to one of which it is hinged to swing open on either side of its closed position and embodying novel latch mechanism holding the gate latched to the other gate post and novel mechanism actuated by a bump imparted thereto by a moving vehicle, on either side of the gate to unlatch the gate and swing the same into an open position which is automatically returned to a closed position by the force of gravity and latched to the respective gate post;

Fig. 2 is a detail view in horizontal longitudinal section taken on the line 2—2 of Fig. 1, on an enlarged scale;

Fig. 3 is a detail view in transverse vertical section taken on the line 3—3 of Fig. 1, on the same scale as Fig. 2;

Fig. 4 is a detail view in horizontal longitudinal section taken on the line 4—4 of Fig. 1 on the same scale as Fig. 2;

Fig. 5 is a front elevational view of the latch mechanism, except the latch rod which is shown in transverse section and a fragment of the post on which the major portion of the latch mechanism is mounted;

Fig. 6 is a fragmentary detail view partly in plan and partly in horizontal longitudinal section taken on the line 6—6 of Fig. 4, on the same scale as Fig. 2;

Fig. 7 is a detail view partly in elevation and partly in transverse vertical section taken on the line 7—7 of Fig. 4.

As shown, the gate closes an opening between a hinge post 8 and a latch post 9 and is a skeleton rectangular horizontally elongated structure. This structure includes upper, lower and intermediate longitudinal members 10, 12 and 11, respectively, rear and front end upright members 13 and 14, respectively, and two upright intermediate members 15 spaced apart in the plane of the gate. The gate members 10 through 15 are tubular, rigidly connected and the openings between said members are closed by woven wire netting 16.

A pair of hinges 17 attach the gate to the hinge post 8 and each of said hinges is in the form of a round loop fixed to the rear gate member 13 and loosely encircling the hinge post 8.

A cable 18 in the form of a chain is fixed at one end to the upper end portion of the hinge post 8, which extends materially above the gate, in the plane thereof when closed. The cable 18, at its other end portion, is adjustably attached to a bar 19 that extends longitudinally over the upper gate member 10 and is fixed thereto at its end portions. This bar 19 is provided with a plurality of longitudinally spaced holes 20 through any one of which a hook 21 attached to the cable 18, may be inserted.

The cable 18 holds the gate suspended with a ground clearance that permits free swinging of the gate on either side of a closed position. This ground clearance may be varied, at will, by changing the attachment of the cable 18 to the bar 19. By changing this attachment of the cable 18 relative to the bars 19, the inclination of the cable and the distance between said attachment and the gate post 8 is changed. When the gate is swung open, the cable 18, at its upper end portion, wraps around the hinge post 8 and thereby shortens the operative length of the cable 18 which lifts the gate and slides the hinges 17 upwardly on the hinge post 8.

Downward pull of the gate by the force of gravity on the cable 18, upon reaching an open position will cause said gate to automatically swing back into a closed position.

The gate is held in a closed position, between the posts 8 and 9, by novel latch mechanism that is actuated to unlatch the gate by novel mechanism that is operated by a bump imparted thereto by a slow moving motor-propelled vehicle approaching the gate on either side thereof. This latch mechanism is also automatically operated by the gate swinging from an open to a closed position to latch the gate closed. The latch mechanism includes a rectangular upright plate 22 that extends transversely of the latch post 9 in opposing relation to the front end of the gate when closed and is secured to said post by a pair of lag screws 23.

A flat horizontal bearing bar 24 extends parallel to the plate 22, is spaced outwardly thereof and has its end portions turned inwardly and fixed to said plate at its end portions. Also fixed to the plate 22 and spaced below the bearing bar 24 is a flat rail 25 that is perpendicular to the plate 22 and integral therewith. The end portions of the rail 25 are downwardly and outwardly inclined.

A pair of keepers 26, each in the form of elongated rectangular members, is pivoted at its upper end portions to turn about a nut-equipped bolt 27 that extends endwise through a pair of horizontal slots 28 in the plate 22 and the bearing bar 24. These keepers 26 are on the outer side of the bearing bar 24 from which they are downwardly inclined toward each other and normally rest on the rail 25 and are spaced apart. There are two washers 29 on each bolt 27, one between its head 30 and the back of the plate 22 and the other between its nut 31 and the outer side of the bearing bar 24. A spacing tube 32 is telescoped onto each bolt 27 with its end portions extending through the slots 28 and held clamped between the two washers 29 on said bolt. These spacing tubes 32 prevent the keepers 26 from being pinched between the outer side of the bearing bar 24 and the adjacent washers 29, so that they are free to turn on the tubes 32. Integral with each keeper 26 at its upper end is an upstanding handle 33 by which said keeper may be manually operated to lift the same from the rail 25.

The latch mechanism further includes a long latch rod 34 that extends horizontally under the intermediate gate member 11 through aligned holes 35 in the front end member 14 and the foremost intermediate gate member 15. A coiled spring 36, encircling the latch rod 34, is compressed between the foremost gate member 15 and a cotter pin 37 that extends through a transverse hole in the latch rod 34 forward of said gate member. This spring 36 yieldingly holds the latch rod 34 projected with its front end portion extending transversely over the rail 25 between the keepers 26. These keepers 26 prevent horizontal lateral movement of the latch rod 34 and thus hold the gate closed.

The latch rod 34 is pulled endwise from between the keepers 26, against the tension of the spring 36, and thus unlatches the gate by means of mechanism including two vertically disposed bump bars 38, one on each side of the gate, between the gate members 15. Each bump bar 38, as shown, is formed of the intermediate portion of a round rod 38', the end portions of which are bent horizontally in the same direction and in the same plane to afford a relatively long upper arm 39 and a relatively short lower arm 40.

The rods 38' are further bent at the outer ends of the upper arms 39 to afford a pair of upstanding trunnions 41 and said rods are also bent at the outer ends of the lower arms 40 to afford a pair of depending trunnions 42. The trunnions 41—42 for each bump bar 38 are axially aligned and the two upper trunions 41 are journaled one in each end portion of a horizontal bearing plate 43 and the two lower trunnions 42 are journaled in the lower gate member 11. The bearing plate 43 extends transversely over and rests, at its longitudinal center, on a flat supporting member 44 to which it is fixed. This supporting member 44 extends longitudinally between the gate members 15 to which it is fixed at its ends.

The rods 38', at the upper ends of the upper trunnions 41, are bent horizontally transversely of the gate over the bearing plate 43 in overlapping relation and in the same vertical plane to afford a pair of crank arms 45. These crank arms 45 are forwardly bowed and the latch rod 34, at its rear end portion, extends transversely over said crank arms and is bent downwardly back thereof to afford a finger 46. The spring 36 yieldingly holds the latch rod 34 with its fingers in contact with the backs of the crank arms 45. A cotter pin 47 that affords a stop extends through a hole in the latch rod 34 back of the foremost gate member 15, normally engages said member and limits the projection of said rod by the spring 36.

The arms 39—40 are normally in forwardly diverging relation to the gate and hold the bump bars 38 spaced outwardly of the gate. The different lengths of the arms 39—40 also hold the bump bars 38 forwardly and outwardly inclined. The long upper arms 39 afford ample leverage for the crank arms 45 in retracting the latch rod 34 against the tension of the spring 36.

To unlatch and open the gate, a motor-propelled vehicle approaching the gate at a slow speed bumps the adjacent bump bar 38. This bump action swings the respective bump bar 38 toward the gate and, in turn, swings the attached crank arm 45 rearwardly and by its engagement with the finger 46 retracts the latch rod 34 against the tension of the spring 36. The initial retracting movement of the latch rod 34 withdraws the same from between the keeper 26, unlatches the gate and the force of the bump swings the gate open.

As heretofore stated, the cable 18 is attached to the gate post 8 in the plane of the gate when closed. During the opening of the gate, the cable 18 is wrapped around the post 8 which progressively shortens the operative length of the cable 18 and thereby lifts the gate and slides the hinges 17 upwardly on the gate post 8.

When the gate stops at the limit of its opening movement, the force of gravity starts downward movement of the raised gate. This movement of the gate pulling on the cable 18 unwraps said cable from the gate post 8 and thereby swings the gate closed. During the final closing movement of the gate, the projecting front end portion of the latch rod 34 moves onto the rail 25 and under the inclined adjacent keeper 26, lifts the same and moves from thereunder into a position between the keeper 26 and thus latches the gate closed. The inclined end portions of the rail 25 facilitate the movement of the latch rod 34 onto said rail.

When one of the bump bars 38 is struck by a vehicle, it is moved away from said vehicle by the opening of the gate and permits the spring 36 to project the latch rod 34 which, in turn, returns the respective bump bar 38 to its operative position.

During the opening of the gate and before it starts its return movement, the vehicle has ample time to move past the open gate.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein, or required by the prior art.

What I claim is:

1. In a releasable locking return gate normally closed between a hinge support and a locking latch support and hinged to the former to swing away from the latter, a releasably locking mechanism including a plate having an elongated rail fixed to the latch post, a pair of spaced apart keepers transversely mounted on and pivoted to the plate above the rail, a latch rod mounted on the gate for endwise sliding movement, and a spring yieldingly holding the latch rod with its outer end portion projected over the rail and between the keepers, bump-actuated means for retracting the latch rod from between the keepers against the tension of the spring including at least one upright bump bar having on its ends an upper arm and a lower arm, said arms having on their outer ends a pair of axial trunnions journaled on the gate, and a crank arm fixed relative to the trunnion on the upper arm for retracting the latch rod, said latch rod normally holding the crank arm with the arms in outwardly diverging relation to the gate.

2. The structure defined in claim 1 in which the upper arm is longer than the lower arm, said arms holding the bump bar upwardly inclined both longitudinally and transversely relative to the gate.

3. In a gravity return bump gate having releasable locking means, said improvement comprising a plate having a rail fixed to the latch support, a pair of keepers pivoted to the plate above the rail, a locking latch rod mounted on the gate for endwise sliding movement, and a spring yieldingly holding the latch rod with its outer end projected over the rail and between the keepers, bump-actuated means for retracting the latch rod from between the keepers against the tension of the spring including a pair of upright bump bars, one on each side of the gate and each having on its ends an upper arm and a lower arm, the arms of each bump bar having on their outer ends a pair of axially aligned trunnions journaled on the gate, and a pair of crank arms fixed one relative to the trunnion on each of the upper arms, the crank arm being in overlapping relation transversely of the gate for retracting the latch rod, said latch rod normally holding the crank arms with the arms in outwardly diverging relation to the gate.

4. A gravity return bump gate having a hinge support on one end and a releasably locking support on the other end, said gate including a rectangular frame having upper, lower and end members and two upright intermediate members spaced apart in the plane of the gate, a supporting member extending between said intermediate members and fixed thereto, and a bearing member extending transversely of the supporting member and fixed thereto, of latch mechanism including a plate having a rail fixed to the latch support, a pair of keepers pivoted to the plate above the rail, a latch rod mounted on the gate for endwise sliding movement, and a spring yieldingly holding the latch rod with its outer end portion projected over the rail and between the keepers, bump-actuated pivotal means for retracting the latch rod from between the keepers against the tension of the spring including a pair of upright bump bars, one on each side of the gate and each having on its outer ends an upper arm and a lower arm, the arms of each bump bar having on their outer ends a pair of axially aligned trunnions, the trunnions on the upper arm being journaled in the bearing member and the trunnions on the lower arms being journaled in the lower member of the gate frame, and a pair of crank arms fixed one relative to the trunnion on each of the upper arms for retracting the latch rod, the crank arms being in overlapping relation transversely of the gate, said latch rod normally holding the crank arms with the arms in outwardly diverging relation to the gate.

5. The structure defined in claim 4 in which the upper arms are longer than the lower arms, said arms holding the bump bars upwardly inclined both longitudinally and transversely of the gate.

6. In a gravity return bump gate having releasable locking means, the improvement in the releasable locking means, said improvement comprising a plate fixed to the latch support and having a horizontal bearing bar fixed thereto and spaced outwardly thereof, a rail extending longitudinally under the bearing bar and spaced therebelow, a pair of headed bolts having nuts, extending through aligned holes in the plate and the bearing bar, washers on the bolts between the heads of the bolts and the back of the plate and between the nuts and the face of the bearing bar, a spacing sleeve telescoped on each bolt between the respective washers, a keeper pivoted at its upper end portion on each spacing sleeve and extending downwardly and inwardly inclined therefrom and normally resting on the rail, a latch rod mounted on the gate for endwise sliding movement, a spring yieldingly holding the latch rod with its outer end portion extending over the rail and between the keepers, and bump-actuated means on the gate for retracting the latch rod from between the keepers.

7. The structure defined in claim 6, further including an upstanding handle on each keeper.

References Cited in the file of this patent

UNITED STATES PATENTS

| | | |
|---|---|---|
| 1,074,750 | Scott | Oct. 7, 1913 |
| 1,896,909 | Maxwell | Feb. 7, 1933 |
| 2,076,092 | Pinard | Apr. 6, 1937 |
| 2,307,545 | Sayles | Jan. 5, 1943 |
| 2,489,078 | Cameron | Nov. 22, 1949 |
| 2,585,481 | Martin | Feb. 12, 1952 |
| 2,629,191 | Koch et al. | Feb. 24, 1953 |
| 2,637,921 | Lein | May 12, 1953 |